Figure 1:
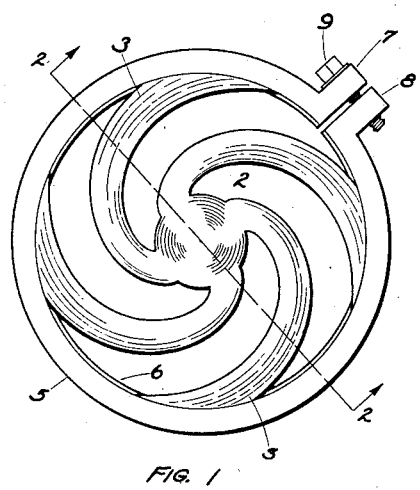

Oct. 18, 1932.      J. A. SPENCER      1,883,249
THERMOSTAT
Original Filed Oct. 31, 1928

INVENTOR
JOHN A. SPENCER
BY
ATTORNEY

Patented Oct. 18, 1932

1,883,249

UNITED STATES PATENT OFFICE

JOHN A. SPENCER, OF NEWTONVILLE, MASSACHUSETTS, ASSIGNOR TO SPENCER THERMOSTAT COMPANY, OF CAMBRIDGE, MASSACHUSETTS, A CORPORATION OF MASSACHUSETTS

THERMOSTAT

Application filed October 31, 1928, Serial No. 316,214. Renewed October 9, 1930.

This invention relates to thermostats and particularly to thermostats adapted to change shape with great suddenness.

In my Patent 1,448,240, granted March 13, 1923, I have disclosed a bimetal thermostat having a cupped portion and adapted to change its position with extreme speed. This thermostat has a bimetallic portion having such a shape that the surface is non-developable. In my Patent 1,602,510, granted October 12, 1926, I have disclosed a bimetal snap acting thermostat in which an elongated bimetallic element is maintained in a curved or buckled condition at all times.

With thermostats it is often desirable to obtain as great a movement of the element as possible corresponding to a predetermined temperature differential in order to actuate desired mechanisms such as switches. My present invention comprises a thermostat which is characterized by considerably greater movement of the element in response to heat strains than is the case with a thermostat of equal size and equal temperature differential but not embodying my invention. My invention of a non-developable bimetallic disk having portions cut out in such manner as to form non-linear or non-radial spokes provides a thermostatic element having an appreciably greater movement in response to heat strains than is obtained with a similar uncut disk. The stresses in such a thermostat are similar to the stresses set up in an uncut disk (see my Patent 1,448,240) as well as those set up in the elongated buckled thermostat (see my Patent 1,602,510). Inasmuch as this thermostat has an appreciably greater movement for a given temperature differential it is desirable for use in electric switching mechanism.

In general any bimetallic or other composite cupped disk as disclosed in my Patent 1,448,240, may be used. Such a disk has portions so cut out as to form a plurality of non-linear or non-radial spokes. As shown, the spokes are volute or spiral shaped. However, the spokes may be of any non-radial form, including linear spokes radiating from a point or points other than the center of the disk; or each spoke may be curved with a single radius of curvature or may have different radii of curvature, or may be a combination of linear portions or a combination of linear and non-linear portions, or of like irregular forms. It is clear that any such form provides a spoke or element of length greater than the radius of the largest plane circle contained within the disc and greater than a great-circular arc connecting the extremities of such a spoke or element.

To retain the member in a cupped shape, I preferably dispose a ring of metal having a low temperature coefficient of expansion around the edge of said disk. Such a ring may take a variety of forms and may if desirable consist of a bezel similar to that in which watch crystals are mounted and having means for varying the diameter of the circular area within moderate limits.

To make a thermostatic switch, an electrical contact may be mounted at the center of said thermostat to cooperate with a stationary contact. It is also possible to maintain the center of the thermostat stationary and allow the peripheral portions to snap up and down. In such a case one or more contacts may be disposed around the edge thereof to cooperate with stationary contacts. Thermostatic units made in accord with this invention may also be used to actuate valves and may be used in general wherever the disk thermostat itself could be used. Where substantially greater amplitude of movement of the bimetallic member is desired as compared with the original disk with the same temperature differential, this invention is of special value.

The invention accordingly comprises the elements and combinations of elements, features of construction, and arrangements of parts which will be exemplified in the structure hereinafter described, and the scope of the application of which will be indicated in the following claims.

Figure 2:
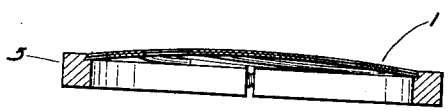

In the accompanying drawing, in which is illustrated one of various possible embodiments of the invention, Figure 1 is a plan view of the thermostat; and, Figure 2 is a sectional view along line 2—2 of Figure 1.

Similar reference characters indicate corresponding parts throughout the several views of the drawing.

Referring now more particularly to the drawing there is represented at numeral 1 a bimetallic member comprising a central portion 2 from which radiate curved or voluted spokes 3. These spokes may take on a variety of forms as pointed out hereinbefore and may either be of uniform width throughout their length or may be tapered either from the center outwardly or the reverse. To retain the thermostatic member in a cupped plane, a bezel 5 is disposed around the periphery thereof. This bezel 5 is preferably of a metal which has a low coefficient of expansion such as invar steel, and is provided with a slot 6 cut around in the inner edge thereof into which bimetallic member 1 may be sprung. Instead of the provision of the bezel 5 the peripheral retaining means may comprise an integral portion of the disk 1.

So that the curvature of the disk may be adjusted, the bezel 5 is split and provided with lugs 7 and 8, and a screw 9 passing freely through 7 and engaging with a threaded portion in lug 8. Turning of the screw 9 alters the curvature of the disk 1 which accordingly changes the temperatures of operation for the thermostat.

A thermostat of this character will respond to heat strains by snapping from one cupped shape to a reverse cupped shape. The temperature differential within which the thermostat will snap back and forth is substantially smaller than the temperature differential of the original disk from which it was cut, assuming equal cupped shapes. For a disk to have the same temperature differential as this thermostat, it would be necessary to have the disk flatter, thus reducing the throw of the disk. If the curvature or cupped shape of the disk is made greater to obtain a greater throw, the temperature differential is correspondingly enlarged. If, however, instead of increasing the curvature of such a disk, it be cut out to form curved spokes and then its curvature increased, it will be found that the throw of the thermostat is appreciably greater than the original disk while maintaining the original temperature differential characteristic of the disk.

Thus it will be seen that I have devised a snap acting thermostat in which the throw or movement of the bimetallic member is substantially increased without substantially affecting other thermostatic properties.

In view of the above, it will be seen that the several objects of the invention are achieved and other advantageous results attained.

As many changes could be made in carrying out the above described constructions without departing from the scope of the invention, it is intended that all matter contained in the above description or shown in the accompanying drawing shall be interpreted as illustrative and not in a limiting sense.

I claim:

1. A thermostat comprising a bimetallic member lying in a cupped plane, said member having a central portion and voluted spoke elements radiating therefrom.

2. A thermostat comprising a bimetallic member lying in a cupped plane, said member having a central portion, voluted spokes radiating therefrom and a metallic rim retaining the free ends of said spokes.

3. A thermostat comprising a bimetallic member lying in a cupped plane, said member having a central portion, tangentially voluted spokes radiating therefrom and a metallic rim of relatively inexpansible material.

4. A thermostat comprising a bimetallic member lying in a cupped plane, said member comprising a central portion, non-linear spokes radiating therefrom, a rim for said bimetallic member and means for adjusting the curvature of the plane in which said bimetallic member lies.

5. A thermostat comprising a bimetallic member lying in a cupped plane, said member including a central portion having non-linear spokes radiating therefrom, a rim of relatively inexpansible material for said bimetallic member and means for adjusting said rim whereby the curvature of the plane in which said bimetallic member lies is varied.

6. A snap-acting thermostatic device comprising a central portion, a peripheral rim portion, and non-radial spokes joining said portions.

7. A thermostatic member comprising a composite, arched sheet, spokes in said sheet, the length of said spokes being greater than the distance along the arch from the center of said sheet to its outer boundary.

In testimony whereof, I have signed my named to this specification.

JOHN A. SPENCER.